(12) United States Patent
Clay et al.

(10) Patent No.: US 8,197,188 B2
(45) Date of Patent: Jun. 12, 2012

(54) COMPRESSOR

(75) Inventors: David Christopher Clay, Leeds (GB); Xioazhen Sheng, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 399 days.

(21) Appl. No.: 11/895,268

(22) Filed: Aug. 23, 2007

(65) Prior Publication Data

US 2008/0056882 A1    Mar. 6, 2008

Related U.S. Application Data (63) Continuation of application No. PCT/GB2006/000634, filed on Feb. 23, 2006.

(30) Foreign Application Priority Data

| Feb. 23, 2005 | (GB) | .................................... | 0503660.3 |
| Sep. 20, 2005 | (GB) | .................................... | 0519152.3 |

(51) Int. Cl.
    *F04D 29/66*     (2006.01)
(52) U.S. Cl. ........................................ 415/119; 415/205
(58) Field of Classification Search .................. 415/119, 415/205, 206; 181/250
See application file for complete search history.

(56) References Cited

U.S. PATENT DOCUMENTS

| 4,244,439 | A | * | 1/1981 | Wested | .......................... | 181/210 |
| 4,743,161 | A | | 5/1988 | Fisher et al. | | |
| 6,582,188 | B2 | * | 6/2003 | Rippl | ............................. | 415/116 |
| 6,601,672 | B2 | * | 8/2003 | Liu | ................. | 181/290 |
| 6,752,240 | B1 | * | 6/2004 | Schlagenhaft | ................ | 181/249 |
| 7,017,706 | B2 | * | 3/2006 | Brown et al. | .................. | 181/256 |
| 7,497,301 | B2 | * | 3/2009 | Cheng et al. | .................. | 181/248 |
| 2001/0036402 | A1 | | 11/2001 | Lalanne et al. | | |
| 2002/0071765 | A1 | | 6/2002 | Sahay et al. | | |
| 2003/0118762 | A1 | | 6/2003 | Brown et al. | | |
| 2008/0292449 | A1 | * | 11/2008 | Lefevre | ........................ | 415/58.4 |

FOREIGN PATENT DOCUMENTS

| DE | 19647605 | | 5/1998 |
| DE | 197 27 139 | A1 | 1/1999 |
| DE | 19818873 | | 11/1999 |
| DE | 100 00 418 | A1 | 8/2000 |
| DE | 10002581 | A1 | 8/2001 |
| DE | 101 12 764 | A1 | 9/2002 |

(Continued)

OTHER PUBLICATIONS

English language abstract of DE 100 00 418 A1, ABB Turbo Systems AG, Aug. 9, 2000.

(Continued)

*Primary Examiner* — Edward Look
*Assistant Examiner* — Ryan Ellis
(74) *Attorney, Agent, or Firm* — Krieg DeVault LLP (57) ABSTRACT

A compressor for compressing a gas comprises an impeller wheel mounted within a housing (2) defining an inlet (8) and an outlet (6). The inlet (8) has a plurality of apertures (20) in the form of bores or grooves defined in its surface that serve as an integral silencer. The inlet (8) may comprise a map-width enhanced structure (4) with the bores provided on one to a number of surfaces. The design provides for a compact and efficient compressor with noise reduction such that higher pressure ratio designs may be adopted. The apertures (20) may be provided in the housing (2) that defines the inlet (8) or in a separate insert.

43 Claims, 5 Drawing Sheets

FOREIGN PATENT DOCUMENTS

| | | |
|---|---|---|
| EP | 0229519 | 7/1987 |
| EP | 0 573 895 A1 | 12/1993 |
| EP | 0 605 184 A1 | 7/1994 |
| FR | 2780454 | 12/1999 |
| GB | 1132485 | 11/1968 |
| GB | 2 364 547 A | 1/2002 |
| JP | 5928097 | 2/1984 |
| WO | WO 02/052110 A1 | 7/2002 |
| WO | WO 2005/124159 | 12/2005 |
| WO | WO 2006/090152 A1 | 8/2006 |

OTHER PUBLICATIONS

English language abstract of EP 0 573 895 A1, A.G. Kuhnle, Kopp & Kausc, Dec. 15, 1993.

* cited by examiner

COMPRESSOR

The present application is a continuation of PCT/GB2006/000634 filed on Feb. 23, 2006 which claims the benefit of United Kingdom Patent Application No. GB0503660.3 filed Feb. 23, 2005 and United Kingdom Patent Application No. GB0519152.3 filed Sep. 20, 2005. Each of the above applications is incorporated herein by reference.

The present invention relates to a compressor. In particular, the invention relates to the inlet arrangement of a centrifugal compressor such as, for example, the compressor of a turbocharger.

A compressor comprises an impeller wheel, carrying a plurality of blades (or vanes) mounted on a shaft for rotation within a compressor housing. Rotation of the impeller wheel causes gas (e.g. air) to be drawn into the impeller wheel and delivered to an outlet chamber or passage. In the case of a centrifugal compressor the outlet passage is in the form of a volute defined by the compressor housing around the impeller wheel and in the case of an axial compressor the gas is discharged axially.

The turbocharger is a well-known device for supplying air to the intake of an internal combustion engine at pressures above atmospheric (boost pressures) and is widely used on automobiles and the like. In a conventional turbocharger the impeller wheel is mounted to one end of a turbocharger shaft and is rotated by an exhaust driven turbine wheel mounted within a turbine housing at the other end of the turbocharger shaft. The shaft is mounted for rotation on bearing assemblies housed within a bearing housing positioned between the compressor and turbine housings. The compressed air is delivered to the intake manifold of the internal combustion engine thereby increasing engine power.

The noise generated by turbocharger compressors can be unpleasant and potentially harmful to users. A significant part of the noise at the inlet of the compressor is as a result of the propagation upstream of acoustic excitations from the impeller wheel blades. Such noise contains a range of components related to harmonics of the shaft rotation speed. It is known to provide a separate silencer unit in ducting upstream of the inlet of the compressor housing in order to attenuate sound waves produced as the air accelerates into the compressor. A typical silencer comprises a cylindrical or conical housing fitted with annular silencer baffles arranged axially along the axis of the housing. An example is described in UK patent No. GB2364547.

The application of a separate silencer device adds to the complexity and cost of a compressor device. It also adds to the number of surfaces that are available for resonance and may contribute to the high cycle fatigue of the impeller wheel blades.

It is particularly important in a turbocharger that the airflow through the compressor is not restricted significantly as this will impair the performance and efficiency of the device. For this reason, baffle design is compromised and offers only limited capabilities in attenuating compressor inlet noise.

It is also known to provide a silencer unit in ducting downstream of the compressor housing to attenuate noise and to stop it causing resonance in the ducting and intercooler downstream of the compressor. Such silencers are designed to attenuate noise occurring once per revolution of the impeller wheel and are not concerned with the type of noise addressed by the present invention.

In some turbochargers the compressor inlet has a structure that has become known as a "map width enhanced" (MWE) structure. An MWE structure is described for instance in U.S. Pat. No. 4,743,161. The inlet of such an MWE compressor comprises two coaxial tubular inlet sections, an outer inlet section or wall forming the compressor intake and inner inlet section wall defining the compressor inducer, or main inlet. The inner inlet section is shorter than the outer inlet section and has an inner surface that is an extension of a surface of an inner wall of the compressor housing which is swept by edges of the impeller wheel blades. The arrangement is such that an annular flow path is defined between the two tubular inlet sections which is open at its upstream end and which is provided with apertures at its downstream end that communicate with the inner surface of the compressor housing which faces the impeller wheel.

It is well known that the MWE structure stabilises the performance of the compressor increasing the maximum flow capacity and improving the surge margin, i.e. decreasing the flow at which the compressor surges. This is known as increasing the width of the compressor "map", which is a plot of the compressor characteristic. However, it has been identified that the structure is also a source of significant noise.

It is an object of the present invention to obviate or mitigate the aforesaid disadvantages and to provide for a compressor with improved noise reduction.

According to a first aspect of the present invention there is provided a compressor for compressing a gas, the compressor comprising: a housing having an inlet and an outlet; an impeller wheel including a plurality of vanes rotatably mounted within the housing between said inlet and outlet; the housing having an inner wall defining a surface located in close proximity to radially outer edges of impeller vanes which sweep across said surface as the impeller wheel rotates about its axis; wherein there is provided at least one noise attenuation aperture defined in said inlet, upstream of said impeller vanes.

The present invention provides for significant improvement in noise reduction in the compressor and allows higher pressure-ratio designs to be used without increased noise penalty.

Moreover, the arrangement attenuates noise at the blade pass frequencies of the compressor impeller wheel (i.e. at multiples of the frequency of revolution of the wheel). This serves to reduce significantly the airborne noise transmission upstream of the impeller wheel towards the air intake.

Ideally the, or each, noise attenuation aperture is defined in that part of the housing that defines the inlet and more preferably in an inside surface of said inlet. Alternatively the holes may be defined in a member that is received in the inlet. The member may be in the form of a sleeve.

The inlet may comprise an outer tubular wall extending away from the impeller wheel in an upstream direction and forming a gas intake portion of the inlet and an inner tubular wall of diameter extending away from the impeller wheel in an upstream direction within the outer tubular wall and defining an inducer portion of the inlet and an annular gas flow passage defined between the inner and outer tubular walls, the annular gas flow passage being in fluid communication with the impeller wheel at least one noise attenuation aperture may be defined on one or more of an inside surface of the inner tubular wall, an inside surface of the outer tubular wall, or an outside surface of the inner tubular wall.

The, or each, noise attenuation aperture is preferably a blind bore or may be an elongate groove. Alternatively the, or each, noise attenuation aperture may be in communication with a closed chamber defined in or around the inlet.

If the attenuation aperture is a groove or grooves they may extend circumferentially around the aperture or may be parallel with a centre axis of the inlet.

The, or each, noise attenuation aperture may be lined with acoustic absorption material. The depth of each aperture is substantially one quarter of the wavelength of the noise emitted at a predetermined blade pass frequency.

The, or each, noise attenuation aperture may be substantially circular or may be non-circular.

The inlet may be an integral part of the housing.

The housing may be a unitary construction.

Ideally, there is provided a plurality of noise attenuation apertures on the, or each, surface.

The inlet may define an inner surface that is an upstream extension of said surface of the housing that is swept by outer edges of the impeller vanes.

According to a second aspect of the present invention there is provided a turbocharger comprising a compressor as defined above.

The compressor according to the present invention is suited for inclusion in a turbocharger.

Other preferred and advantageous features of the invention will be apparent from the following description.

Specific embodiments of the present invention will now be described, by way of example only, with reference to the accompanying drawings, in which.

Figures 1, 2, 3:
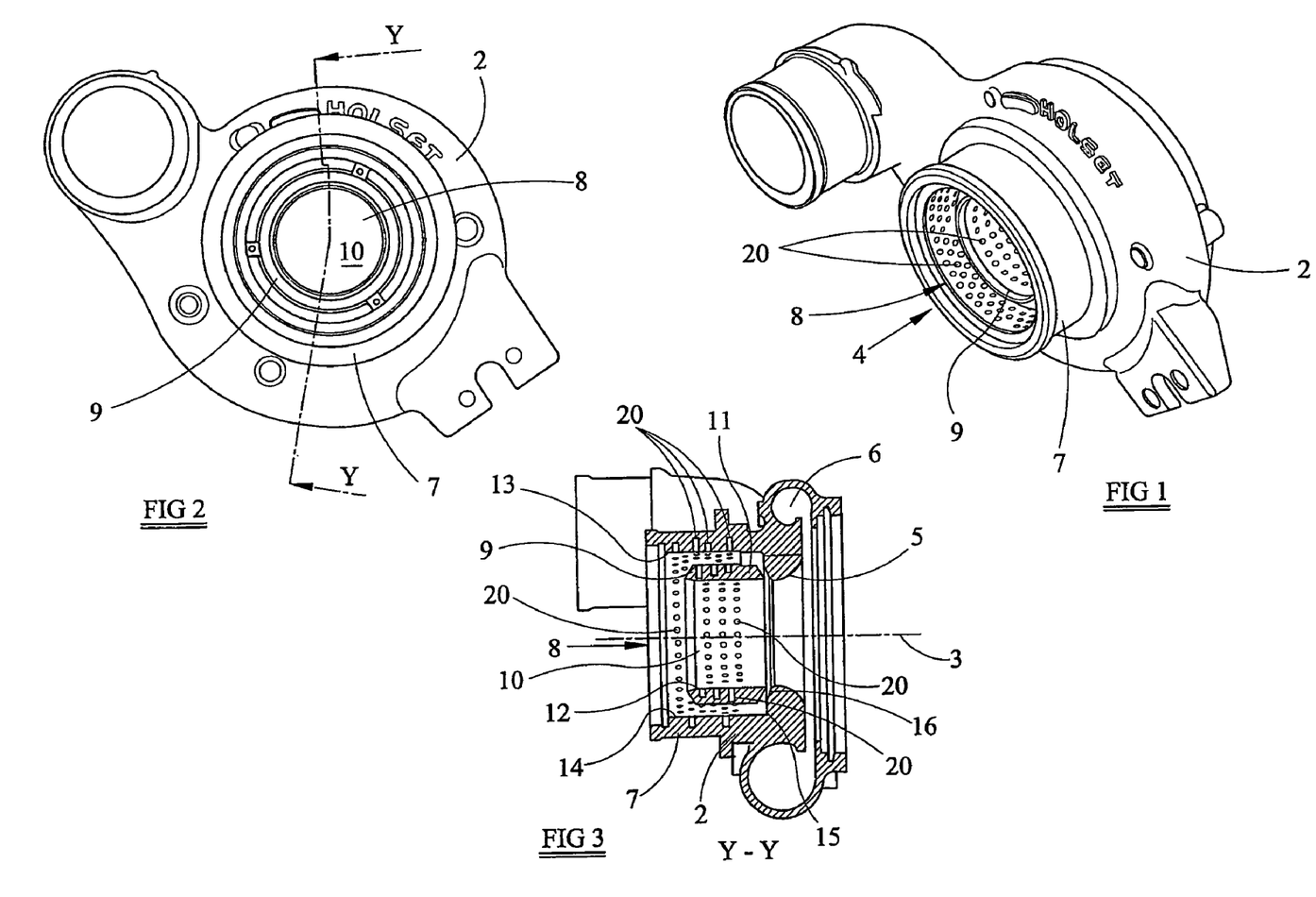
FIG. 1 is a perspective view of an MWE compressor according to the present invention.
FIG. 2 is a plan view of the compressor of FIG. 1.
FIG. 3 is a cross-section along line Y-Y of FIG. 2.

Referring to FIGS. 1 to 3, the illustrated MWE compressor is a centrifugal compressor comprising an impeller wheel mounted within a compressor housing 2 on one end of a rotating shaft (not shown) which extends along compressor axis 3. For the purposes of clarity the impeller wheel is not shown in the figures but the space it occupies is generally indicated by reference numeral 1. The wheel typically has a plurality of vanes each of which has an outer edge that sweeps across an inner housing surface 5 when the impeller wheel rotates about the axis 3. The compressor housing 2 defines an outlet volute 6 surrounding the impeller wheel and an integral MWE inlet structure 4 comprising an outer tubular wall 7 extending outwardly upstream of the impeller space 1 and defining an intake 8 for gas such as air and an inner tubular wall 9 which extends part way into the intake 8 and defines the compressor inducer 10. The inner wall 9 defines an outer surface 11 and an inner surface 12 that is an upstream extension of the housing wall surface 5 which is swept by the outside edges of the impeller blades. The outer wall 7 has defines an inner surface 13

An annular flow passage 14 is defined around the inducer 10 between the inner and outer walls 9 and 8. The flow passage 14 is open to the intake portion 8 of the inlet at its upstream end and is closed at its downstream end by an annular wall 15 of the housing 2, but communicates with the impeller wheel via apertures or slots 16 formed through the wall 15.

The inner surface 13 of the outer wall 7 and the inner and outer surfaces 12, 11 of the inner wall 9 have a plurality of blind bores 20 machined therein in a predetermined array. The arrangement and geometry of the bores 20 is designed such that they act as quarter-wave side branch resonators. This means that the depth of the bores 20 is designed to be approximately equal to one quarter of the wavelength of the noise at the desired attenuation frequencies. The noise component attenuated by the present invention is that emanating from the main blades. The frequency of such noise depends on the number of main blades but is typically 6 to 8 times the frequency of revolution of the impeller wheel although it should be noted that the blade pass frequency might be described as 12 or 14 times the frequency of revolution of the impeller wheel to take account of both the main and splitter blades. In the figures the cross-section of the bores 20 is circular and the diameter is not greater than the bore depth. The bore diameter may typically be around 3 or 4 mm. It is to be understood that the bore cross-section is not critical and may be oval, square, slot shaped or the like. The centre spacing of the bores 20 has to be considered carefully to avoid interference between adjacent resonators but may be typically in the region of 4 mm to 7 mm.

It is to be understood that the bores 20 may be provided on one or more of the following surfaces: the inner surface 13 of the outer wall 7 and the outer surface 11 of the inner wall 9 which surfaces combine to bound the annular flow passage, and the inner surface 12 of the inner wall 9.

Figure 4:
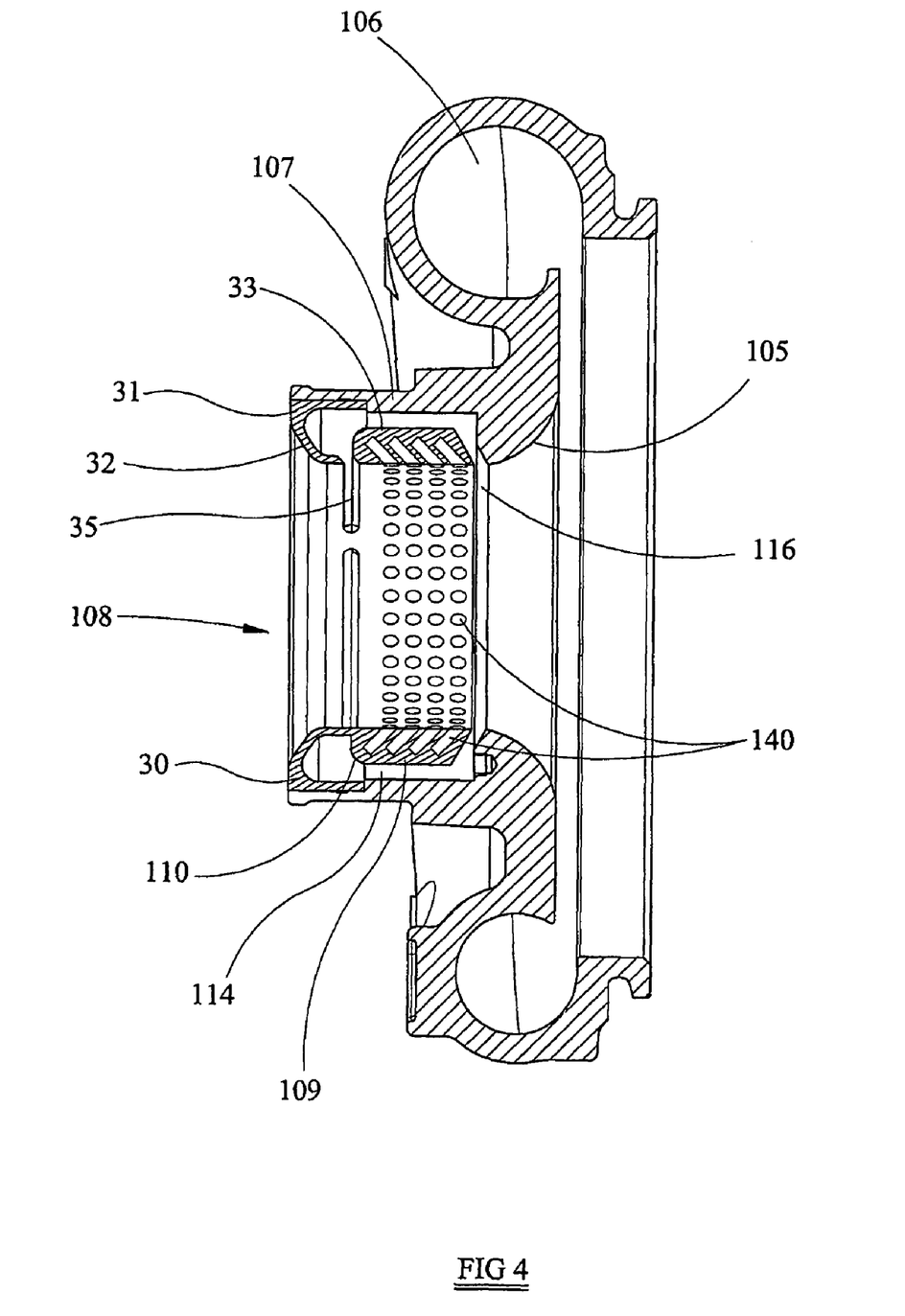
FIG. 4 is a cross-section side view of a second embodiment of a compressor in accordance with the present invention.

The compressor housing 2 is a unitary cast structure and the blind bores 20 are shown as being defined on the interior surfaces of the inlet. These may be produced during the casting process or may be machined after casting. However, it is likely to be more practical to provide separate perforated sleeves or linings that are inserted into the inlet 4, the holes in the sleeves effectively being closed by the inside surface of the inlet. An example similar to this is illustrated in the embodiment of FIG. 4 that is described below.

The provision of a silencer upstream of the impeller vanes is advantageous over the prior art compressor design that have separate silencer units. By making the silencer as part of the inlet of the compressor housing it is compact, simple, does not add to the risk of creating more noise and can be adapted specifically to attenuate noise at the blade pass frequencies.

In a modification to the embodiment shown the bores 20 may be lined with an acoustic absorption material.

In an alternative embodiment (not shown) the bores 20 are replaced by holes that open into a closed chamber defined in or around the outer wall 7 of the MWE annular flow passage 14. Such an arrangement provides for a Helmholtz type of resonator.

FIG. 4 illustrates a second embodiment of the present invention in which parts corresponding to those of FIGS. 1 to 3 are indicated by the same reference numerals increased by 100 and are not further described except in so far as they differ from their counterparts in FIGS. 1 to 3. In this embodiment the silencer is provided by a sleeve 30 that is inserted into the intake 108 of the compressor housing. The sleeve 30 has a first portion 31 that is received inside the outer wall of the intake 108 such that its outer surface engages the inner surface 113 of the wall. This end section of the wall is stepped to provide a shoulder 34 against which the first portion 31 abuts. This first portion 31 has an outer annular section that abuts the surface 113 and an inner tapered portion 32 that directs air into the intake 108. A second portion 33 of the sleeve 30 serves to define the inducer 110 and the blind bores 140. The inner and outer walls 109, 107 again serve to define the annular flow passage 114 of the MWE inlet structure. Air that egresses into the annular passage through slots 116 is able to re-enter the inducer via an annular slot 35 that separates the first and second portions 31, 33 of the sleeve 30.

In the embodiment of FIG. 4 the bores are shown inclined i.e. they do not extend in a radial direction as their longitudinal axes do not intersect the axis of the inlet 104 at right angles.

Figure 5:
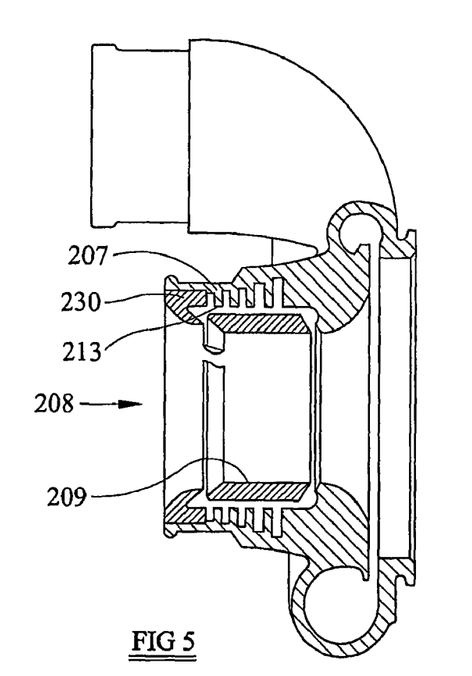
FIG. 5 is a cross-section side view of a third embodiment of a compressor in accordance with the present invention.
Figure 6:
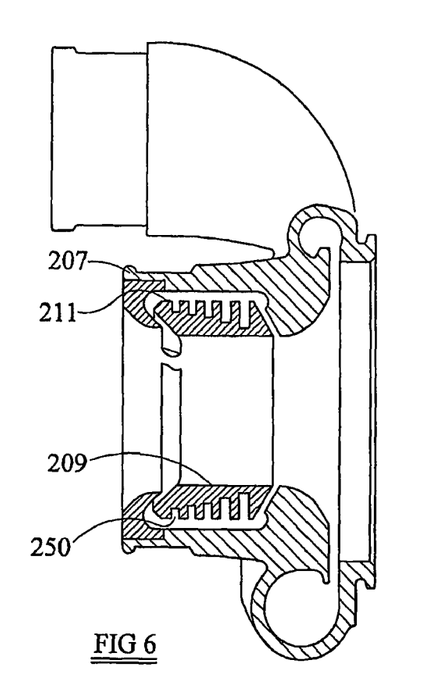
FIG. 6 is a cross-section side view of a fourth embodiment of a compressor in accordance with the present invention.

Instead of bores, apertures in the form of grooves may be used. Examples are shown in the embodiments of FIGS. 5 and 6 in which parts corresponding to those of FIGS. 1 to 3 are indicated by the same reference numerals increased by 200 and are not further described except in so far as they differ from their counterparts in FIGS. 1 to 3. In FIG. 5 the inner surface 213 of the outer wall 207 has a plurality of axially spaced grooves 250 that extend circumferentially. The MWE inlet structure is provided by an insert sleeve 230 as in the FIG. 4 embodiment but has no noise attenuation apertures defined in the inner wall 209. The grooves 250 are shown as increasing in depth towards the impeller. The embodiment of FIG. 6 differs from that of FIG. 5 only in that the grooves 250 are instead formed on the outer surface 211 of the inner wall 209 of the MWE structure.

Figure 7:
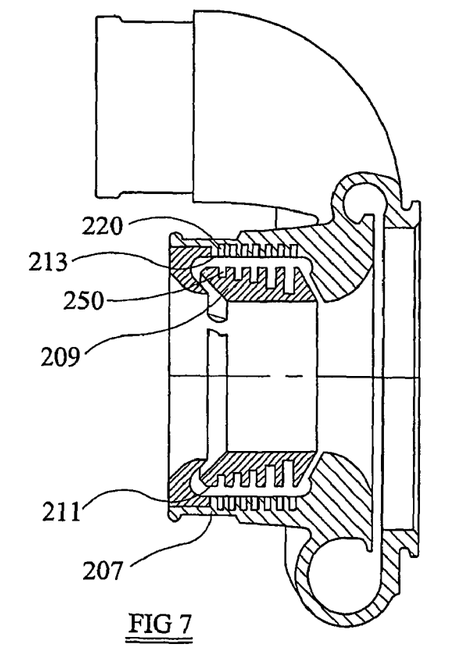
FIG. 7 is a cross-section side view of a fifth embodiment of a compressor in accordance with the present invention.
Figure 8:
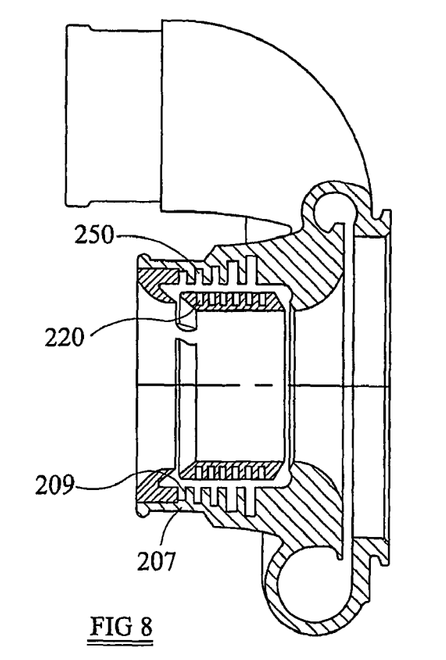
FIG. 8 is a cross-section side view of a sixth embodiment of a compressor in accordance with the present invention.
Figure 9:
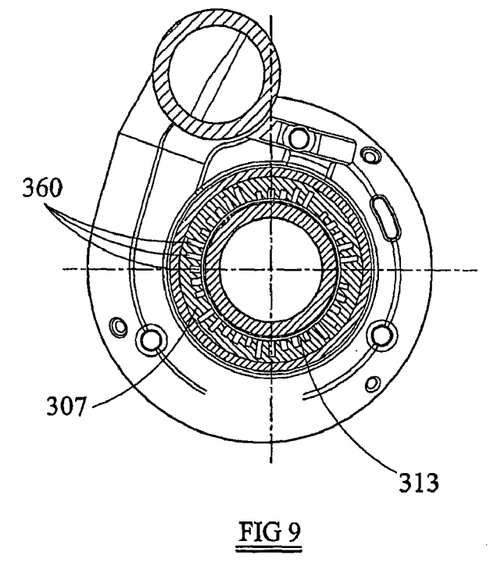
FIG. 9 is a sectioned view from the front of a seventh embodiment of a compressor in accordance with the present invention.

FIGS. 7 and 8 illustrate exemplary embodiments in which the noise attenuation apertures are provided by a combination of blind bores 220 and grooves 250. In the embodiment of FIG. 7, grooves 250 are defined on the outer surface 211 of the inner wall 209 as in the compressor of FIG. 6, but there are also blind bores 220 defined on the inside surface 213 of the outer wall 207. In FIG. 9 the positions of the grooves 250 and blind bores 220 are reversed.

Figure 10:
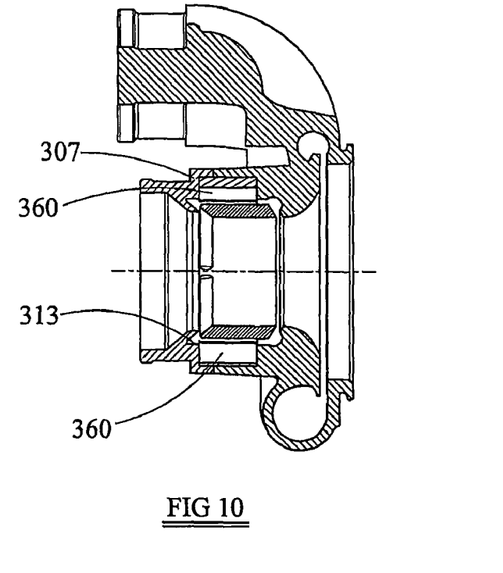
FIG. 10 is a cross-section view from the side of FIG. 9.
Figure 11:
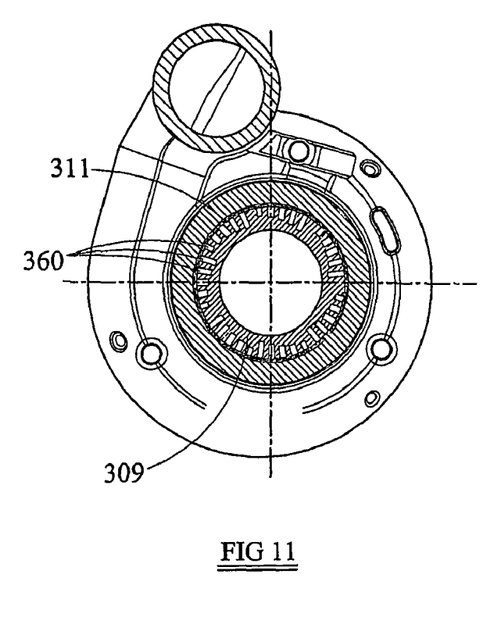
FIG. 11 is a sectioned view from the front of an eighth alternative embodiment of a compressor in accordance with the present invention.
Figure 12:
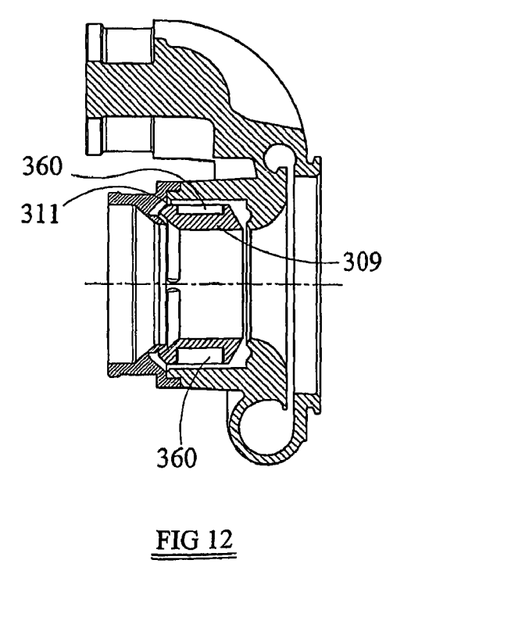
FIG. 12 is a cross-section view from the side of FIG. 11.

In alternative embodiments as illustrated in FIGS. 9 to 12, the grooves 360 may extend in an axial direction in which case they are spaced in a circumferential direction. In the embodiment of FIGS. 9 and 10, the grooves 360 are defined in the inside surface 313 of the outer wall 307 of the MWE structure whereas in the embodiment of FIGS. 11 and 12 the grooves 360 are defined on the outside surface 311 of the inner wall 309. It is to be appreciated that the grooves 350, 360 may be provided on both surfaces or may be supplemented with blind bores 20, 120, 220 on the opposite surface. It will be seen that the grooves are of varying depths configured to attenuate the different frequencies as required.

Figure 13:
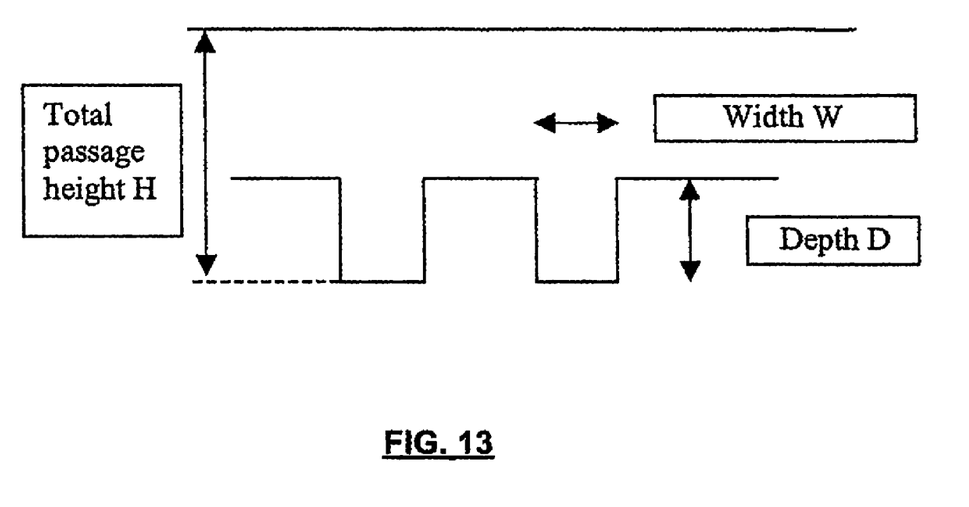
FIG. 13 is a diagram used to illustrate the relationship between dimensions of the annular passage and the noise attenuation apertures.

The depth D and width W of the apertures in relation to the height H of the MWE annular flow passage 14 are configured to attenuate the noise, with different widths W and depths D being provided as required to address different noise wavelengths. The apertures are thus designed such that they are tuned to damp actively the noise concerned. Ideally depth D is approximately one quarter of the wavelength of the noise that is to be attenuated and the width W is not greater than half the height H of the passage. Obviously the greater the noise problem at particular wavelengths and frequencies the greater the number of apertures configured to attenuate such noise.

It will be appreciated that numerous modifications to the above described designs may be made without departing from the scope of the invention as defined in the appended claims. For example, the invention may be applied to a compressor that does not have a MWE inlet structure. Moreover, the noise attenuating aperture or apertures may take any suitable form such as bores, grooves, slots or other recesses or cavities. Any of the apertures may be open to a chamber to form a Helmholtz resonator. Furthermore, any of the apertures may be lined with an acoustically absorbent material.

Compressors in accordance with the present invention may have many applications and in particular are suitable for incorporation in turbochargers.

The invention claimed is:

1. A compressor for compressing a gas, the compressor comprising:
    a housing having an inlet and an outlet;
    an impeller wheel including a plurality of vanes rotatably mounted within the housing between said inlet and outlet;
    the housing having an inner wall defining a surface located in close proximity to radially outer edges of impeller vanes which sweep across said surface as the impeller wheel rotates about its axis;
    the inlet comprises an outer tubular wall extending away from the impeller wheel in an upstream direction and forming a gas intake portion of the inlet and an inner tubular wall of diameter extending away from the impeller wheel in an upstream direction within the outer tubular wall and defining an inducer portion of the inlet and an annular gas flow passage defined between the inner and outer tubular walls, the annular gas flow passage being in fluid communication with the impeller wheel; and
    wherein there is provided a plurality of blind noise attenuation apertures defined in an inside surface of a part of the housing that defines said inlet, along the length of the inlet, upstream of said impeller vanes.

2. A compressor according to claim 1, wherein the inlet is further defined by a member disposed inside said housing, and the, or each, noise attenuation aperture is defined in said member.

3. A compressor according to claim 2, wherein the member is supported at one end of the inlet part of the housing and the inner tubular wall is defined by the insert.

4. A compressor according to claim 3, wherein the inner tubular wall is free from supports in the annular gas flow passage.

5. A compressor according to claim 4, wherein the member has a first portion that is supported at one end of the inlet part of the housing such that an outer surface of that first portion engages the inner surface of the end of the inlet part of the housing.

6. A compressor according to claim 5, wherein the first portion of the member has an outer annular section and an inner tapered portion that, in use, directs air into the inlet.

7. A compressor according to claim 6, wherein the member has a second portion that forms said inner tubular wall, the second portion being joined to the first portion but being separated by a discontinuous annular slot.

8. A compressor according to claim 3, wherein the member has a first portion that is supported at one end of the inlet part of the housing such that an outer surface of that first portion engages the inner surface of the end of the inlet part of the housing.

9. A compressor according to claim 8, wherein the first portion of the member has an outer annular section and an inner tapered portion that, in use, directs air into the inlet.

10. A compressor according to claim 9, wherein the member has a second portion that forms said inner tubular wall, the second portion being joined to the first portion but being separated by a discontinuous annular slot.

11. A compressor according to claim 1, wherein at least one noise attenuation aperture is defined in an inside surface of the inner tubular wall.

12. A compressor according to claim 1, wherein at least one noise attenuation aperture is defined in an inside surface of the outer tubular wall.

13. A compressor according to claim 1, wherein there are a plurality of noise attenuation apertures defined along the length of the annular gas flow passage.

14. A compressor according to claim 13, wherein at least one noise attenuation aperture is a blind bore.

15. A compressor according to claim 14, wherein the, or each, noise attenuating aperture has a longitudinal axis that extends in a non-radial direction.

16. A compressor according to claim 15, wherein the longitudinal axis of the aperture extends in a direction that is inclined at an angle of less than 90° to the axis of the inlet.

17. A compressor according to claim 13, wherein at least one noise attenuation aperture is an elongated groove.

18. A compressor according to claim 17, wherein the groove or grooves extend circumferentially around the inlet.

19. A compressor according to claim 17, wherein the groove or grooves extend in a direction that is substantially parallel with a centre axis of the inlet.

20. A compressor according to claim 1, wherein at least one noise attenuation aperture is in communication with a closed chamber defined in or around the inlet.

21. A compressor according to claim 1, wherein at least one noise attenuation aperture is lined with acoustic absorption material.

22. A compressor according to claim 1, wherein the depth of each aperture is substantially one quarter of the wavelength of the noise emitted at a predetermined blade pass frequency.

23. A compressor according to claim 1, wherein at least one noise attenuation aperture is substantially circular.

24. A compressor according to claim 23, wherein the, or each, noise attenuating aperture has a longitudinal axis that extends in a non-radial direction.

25. A compressor according to claim 24, wherein the longitudinal axis of the aperture extends in a direction that is inclined at an angle of less than 90° to the axis of the inlet.

26. A compressor according to claim 1, wherein the, or each, noise attenuation aperture is substantially non-circular.

27. A compressor according to claim 1, wherein the inlet is an integral part of the housing.

28. A compressor according to claim 1, wherein the inlet defines an inner surface that is an upstream extension of said surface of the housing that is swept by outer edges of the impeller vanes.

29. A compressor according to claim 1, wherein the housing is a unitary structure.

30. A turbocharger comprising a compressor according to claim 1.

31. A compressor for compressing a gas, the compressor comprising:
   a housing having an inlet and an outlet;
   an impeller wheel including a plurality of vanes rotatably mounted within the housing between said inlet and outlet;
   the housing having an inner wall defining a surface located in close proximity to radially outer edges of impeller vanes which sweep across said surface as the impeller wheel rotates about its axis;
   wherein the inlet comprises an outer tubular wall extending away from the impeller wheel in an upstream direction and forming a gas intake portion of the inlet and an inner tubular wall of diameter extending away from the impeller wheel in an upstream direction within the outer tubular wall and defining an inducer portion of the inlet and an annular gas flow passage defined between the inner and outer tubular walls, the annular gas flow passage being in fluid communication with the impeller wheel;
   wherein there is provided at least one noise attenuation aperture defined in said inlet, upstream of said impeller vanes;
   wherein the inlet is defined by a member disposed inside said housing, and the, or each, noise attenuation aperture is defined in said member, the member being supported at one end of the inlet part of the housing and the inner tubular wall being defined by the member.

32. A compressor according to claim 31, wherein the, or each, noise attenuation aperture is defined in an inside surface of a part of the housing that defines said inlet.

33. A compressor according to claim 32, wherein the inner tubular wall is free from supports in the annular gas flow passage.

34. A compressor according to claim 32, wherein the member has a first portion that is supported at one end of the inlet part of the housing such that an outer surface of that first portion engages the inner surface of the end of the inlet part of the housing.

35. A compressor according to claim 34, wherein the first portion of the member has an outer annular section and an inner tapered portion that, in use, directs air into the inlet.

36. A compressor according to claim 34, wherein the member has a second portion that forms said inner tubular wall, the second portion being joined to the first portion but being separated by a discontinuous annular slot.

37. A compressor according to claim 31, wherein the member has a first portion that is supported at one end of the inlet part of the housing such that an outer surface of that first portion engages the inner surface of the end of the inlet part of the housing.

38. A compressor according to claim 37, wherein the first portion of the member has an outer annular section and an inner tapered portion that, in use, directs air into the inlet.

39. A compressor according to claim 37, wherein the member has a second portion that forms said inner tubular wall, the second portion being joined to the first portion but being separated by a discontinuous annular slot.

40. A compressor according to claim 31, wherein at least one noise attenuation aperture is defined on an inside surface of the inner tubular wall.

41. A compressor according to claim 31, wherein at least one noise attenuation aperture is defined in an outside surface of the inner tubular wall.

42. A compressor for compressing a gas, the compressor comprising:
   a housing having an inlet and an outlet;
   an impeller wheel including a plurality of vanes rotatably mounted within the housing between said inlet and outlet;
   the housing having an inner wall defining a surface located in close proximity to radially outer edges of impeller vanes which sweep across said surface as the impeller wheel rotates about its axis;
   the inlet comprises an outer tubular wall extending away from the impeller wheel in an upstream direction and forming a gas intake portion of the inlet and an inner tubular wall of diameter extending away from the impeller wheel in an upstream direction within the outer tubular wall and defining an inducer portion of the inlet and an annular gas flow passage defined between the inner and outer tubular walls, the annular gas flow passage being in fluid communication with the impeller wheel;

wherein there is provided a plurality of noise attenuation apertures defined in an inside surface of a part of the housing that defines said inlet, along the length of the inlet, upstream of said impeller vanes; and wherein at least one of the noise attenuation apertures is a blind bore.

43. A compressor for compressing a gas, the compressor comprising:

a housing having an inlet and an outlet;

an impeller wheel including a plurality of vanes rotatably mounted within the housing between said inlet and outlet;

the housing having an inner wall defining a surface located in close proximity to radially outer edges of impeller vanes which sweep across said surface as the impeller wheel rotates about its axis;

the inlet comprises an outer tubular wall extending away from the impeller wheel in an upstream direction and forming a gas intake portion of the inlet and an inner tubular wall of diameter extending away from the impeller wheel in an upstream direction within the outer tubular wall and defining an inducer portion of the inlet and an annular gas flow passage defined between the inner and outer tubular walls, the annular gas flow passage being in fluid communication with the impeller wheel;

wherein there is provided a plurality of noise attenuation apertures defined in an inside surface of a part of the housing that defines said inlet, along the length of the inlet, upstream of said impeller vanes; and wherein at least one of the noise attenuation apertures is a blind elongated groove.

* * * * *